United States Patent
Dube

(10) Patent No.: US 9,174,165 B1
(45) Date of Patent: Nov. 3, 2015

(54) ACIDIC GAS REMOVAL USING DRY SORBENT INJECTION

(71) Applicant: ALSTOM Technology Ltd, Baden (CH)

(72) Inventor: Sanjay Kumar Dube, Knoxville, TN (US)

(73) Assignee: ALSTOM Technology Ltd, Baden (CH)

(*) Notice: Subject to any disclaimer, the term of this patent is extended or adjusted under 35 U.S.C. 154(b) by 0 days.

(21) Appl. No.: 14/471,422

(22) Filed: Aug. 28, 2014

(51) Int. Cl.
| | |
|---|---|
| *B01D 53/50* | (2006.01) |
| *B01D 53/62* | (2006.01) |
| *B01D 53/68* | (2006.01) |
| *C01D 7/07* | (2006.01) |
| *B01D 53/40* | (2006.01) |
| *B01D 53/81* | (2006.01) |

(52) U.S. Cl.
CPC .............. *B01D 53/40* (2013.01); *B01D 53/508* (2013.01); *B01D 53/62* (2013.01); *B01D 53/685* (2013.01); *B01D 53/81* (2013.01); *B01D 2253/112* (2013.01); *B01D 2258/0283* (2013.01)

(58) Field of Classification Search
CPC ...... B01D 53/50; B01D 53/501; B01D 53/62; B01D 53/68; C01D 7/07
USPC .................................................... 423/244.08
See application file for complete search history.

(56) References Cited

U.S. PATENT DOCUMENTS

| | | | |
|---|---|---|---|
| 276,990 A | 5/1883 | Gaskell, Jr. et al. | |
| 574,089 A | 12/1896 | Hawliczek | |
| 3,647,365 A | 3/1972 | Saeman | |
| 3,846,535 A | 11/1974 | Fonseca | |
| 4,385,039 A | 5/1983 | Lowell et al. | |
| 4,452,766 A * | 6/1984 | Pike ..................... | B01D 53/501 423/166 |
| 4,459,272 A | 7/1984 | Krieg et al. | |
| 7,910,079 B2 * | 3/2011 | Anttila ................. | B01D 53/502 423/220 |
| 8,206,670 B2 * | 6/2012 | Detournay ............... | C01D 7/07 423/244.07 |
| 8,916,118 B2 * | 12/2014 | Escudero ............. | B01D 53/501 423/225 |
| 2006/0286011 A1 * | 12/2006 | Anttila ................. | B01D 53/502 422/168 |
| 2013/0156673 A1 * | 6/2013 | Nagayasu ............... | B01D 53/75 423/243.08 |

FOREIGN PATENT DOCUMENTS

FR     2273765 A1 * 1/1976 ............... C01D 7/07

* cited by examiner

*Primary Examiner* — Timothy Vanoy
(74) *Attorney, Agent, or Firm* — Rita D. Vacca

(57) ABSTRACT

A system and method for desulfurization or acidic gas removal from a hot flue gas is provided that uses a dry sorbent injection technology with downstream sorbent reproduction based on a dual-alkali process. As such, lime and flue gas carbon dioxide are used in a process to produce the dry sorbent, sodium bicarbonate.

15 Claims, 3 Drawing Sheets

ACIDIC GAS REMOVAL USING DRY SORBENT INJECTION

FIELD OF THE DISCLOSURE

This disclosure provides a system and method for desulfurization or acidic gas removal from a hot flue gas using a dry sorbent injection technology based on a dual-alkali process. More specifically, the disclosure provides a system and method for desulfurization or acidic gas removal from a hot flue gas using a dry sorbent injection technology based with downstream sorbent reproduction using lime and flue gas carbon dioxide.

BACKGROUND OF THE DISCLOSURE

The conventional technique for commercial production of sodium bicarbonate dissolves soda ash in a spent reaction liquor from a prior reaction, consisting of water containing small quantities of dissolved soda ash and sodium bicarbonate. The solution is then carbonated to precipitate crystals of sodium bicarbonate. The sodium bicarbonate crystals are separated from the liquor and dried to yield highly purified, high density crystals. Disadvantages of the conventional method are that the procedure requires several steps, and necessitates using of separation equipment, drying of the product, and handling of large volumes of liquids.

Sodium bicarbonate may also be produced by various dry carbonation techniques. In U.S. Pat. Nos. 276,990 and 574,089, a sodium bicarbonate product is formed by placing hydrated soda ash in a revolving cylinder and then introducing carbon dioxide into the cylinder. Both patents teach reaction times of approximately five to six hours.

U.S. Pat. No. 3,647,365 teaches a process in which hollow sodium bicarbonate beads of low density are prepared in a multistage reactor from hydrated soda ash, small amounts of water and carbon dioxide. This process requires several steps and must proceed slowly, with carbonation times exceeding one hour and drying times taking up to eight hours. Further, the soda ash must first be hydrated in a separate step and the reaction must occur at a temperature above 95.7° F. to achieve a commercially acceptable reaction rate.

More recently, U.S. Pat. No. 4,459,272, discloses a process for the preparation of sodium bicarbonate by the reaction of a solid, particulate sodium carbonate-containing material with liquid water in a carbon dioxide-rich atmosphere. The particulate mass is mixed in an internally agitated or externally rotated or vibrated reactor with the water and carbon dioxide. The reaction is carried out at temperatures from 125° F. to 240° F. under atmospheres containing from 20% to 90% carbon dioxide by volume. The process is carried out under reduced water vapor partial pressures to promote evaporation of water from the surfaces of the reacting carbonate particles, and to maintain high carbon dioxide partial pressures in the reactor atmosphere. Products formed by the process have apparent bulk densities as high as 50-60 lbs/ft$^3$.

Each of the previously described dry carbonation techniques is subject to particular disadvantages. In each process, the carbon dioxide concentration must be high and the reaction temperature must also be high, or the reaction rate is prohibitively low. None of these methods can produce sodium bicarbonate at low temperatures and low carbon dioxide concentrations, at commercially acceptable reaction rates.

Sodium bicarbonate has also been produced, as well as utilized, in dry sorbent injection processes for removing sulfur dioxide emissions from the combustion gases of fossil fuel fired burners. Such techniques have commanded considerable attention recently, particularly since they present the lowest "first cost" alternative for removing potentially dangerous sulfur dioxide from flue gases. Sodium bicarbonate has been demonstrated to be a very effective sorbent for dry sorbent injection processes. However, the cost of pharmaceutical grade sodium bicarbonate, as currently produced, is a major drawback to its use for such purpose.

U.S. Pat. Nos. 3,846,535 and 4,385,039 disclose methods for regenerating sodium bicarbonate from sulfate-containing solid waste formed by dry sorbent injection with sodium bicarbonate. According to U.S. Pat. No. 3,846,535, a regeneration step is accomplished by forming an aqueous solution of the sodium sulfate containing waste, and treating such solution with ammonium bicarbonate to precipitate sodium bicarbonate. The sodium bicarbonate is then separated, dried and recycled for further use. According to U.S. Pat. No. 4,385,039, a regeneration step involves dissolving the solid desulfurization reaction product in a basic liquor, which contains borate ions and/or ammonia. Carbonation of this liquor results in a sodium bicarbonate precipitate. Each of these disclosed processes suffer from the use of complicated and capital-intensive equipment and solution operations.

An improved process for the production of sodium bicarbonate for use in dry flue gas desulphurization processes that does not require the multiple operations and systems required by prior art processes is needed. Further, a process to produce bicarbonate sorbent directly employed in the desulfurization of flue gases, that is efficient and economical, is needed.

SUMMARY OF THE DISCLOSURE

The subject system and method is a dry flue gas desulfurization system that uses dry sorbent injection of sodium bicarbonate for acidic gas ($SO_2$, $SO_3$, HCl, HF) removal from flue gas generated by a power plant or other industrial plant, with integrated sodium bicarbonate sorbent regeneration using a dual alkali process. Accordingly, the subject system uses an injector operable to inject a sorbent into a duct through which plant flue gas flows to a particulate collection device. By injecting sorbent directly into a duct with hot flue gas flow, capital and operational costs are significantly lower than that for other commercially available emission control systems. The injected sorbent efficiently achieves flue gas acid gas removal. Filters within a particulate collection device are used to collect spent sorbent, unused sorbent and particulates such as fly ash from flue gas flowing therethrough. An alkali reactor is used for reaction of the spent sorbent, unused sorbent and particulates collected in the particulate collection device, with lime, water and air to produce sodium hydroxide and gypsum. The produced gypsum may be discarded or used in the production of building materials. A carbon dioxide reactor is used to react the sodium hydroxide produced in the alkali reactor with flue gas carbon dioxide to produce sodium bicarbonate sorbent for injection. The reaction of sodium hydroxide with carbon dioxide produces sodium bicarbonate sorbent for use in the subject system. As such, sorbent cost for emissions control is significantly reduced.

The subject method of dry flue gas desulfurization uses semi-dry sorbent (in the form of a slurry) injection by injecting a sorbent into a duct through which plant flue gas flows. By injecting sorbent directly into a duct with hot flue gas flow, this method significantly reduces capital and operational costs over those of other commercially available emission control systems. The sorbent is injected into the flue gas duct for flue gas acid gas $SO_2$, $SO_3$, HCl, HF removal by the sorbent. Collecting spent sorbent, unused sorbent and other flue gas particulates such as fly ash is accomplished with filters within a particulate collection device. As such, spent sorbent, unused sorbent and flue gas particulates collected from the flue gas flowing through the particulate collection device may be used to regenerate the sorbent. Reacting the collected spent sorbent, unused sorbent and flue gas particulates with lime, water and air to produce sodium hydroxide and gypsum. The produced sodium hydroxide and gypsum are separable in a product separator, such as a hydrocyclone. The produced gypsum may be discarded or used in the production of building materials or the like. Reacting the produced sodium hydroxide with a relatively small slip stream of flue gas carbon dioxide produces sodium bicarbonate sorbent for injection. By regenerating the sodium bicarbonate sorbent through the subject method, sorbent cost for emissions control is significantly reduced.

In summary, the subject dry flue gas desulfurization system comprises an injector operable to inject a sorbent into a duct through which plant flue gas flows to a particulate collection device for flue gas acid gas removal by the sorbent, filters within the particulate collection device operable to collect spent sorbent from flue gas flowing therethrough, an alkali reactor operable for reaction of spent sorbent, lime, water and air to produce sodium hydroxide and gypsum, and a carbon dioxide reactor operable for reaction of sodium hydroxide with flue gas carbon dioxide to produce sodium bicarbonate sorbent for injection. The sorbent used and produced in this system is sodium bicarbonate. The particulate collection device uses filters that are fabric or electrostatic to collect the spent sorbent. The collected and reacted spent sorbent produces sodium hydroxide and gypsum separable in a product separator, such as a hydrocyclone. Optionally, in the production of the sorbent, the spent sorbent may be reacted with sulfuric acid prior to reaction with lime. Using the subject system, flue gas acid gas includes $SO_2$, $SO_3$, HCl and HF and removal includes desulfurization.

In summary, the subject method of dry flue gas desulfurization comprises injecting a sorbent into a duct through which plant flue gas flows to a particulate collection device for flue gas acid gas removal by the sorbent, collecting with filters within the particulate collection device spent sorbent from flue gas flowing therethrough, reacting spent sorbent, lime, water and air to produce sodium hydroxide and gypsum, and reacting sodium hydroxide with flue gas carbon dioxide to produce sorbent for injection. The sorbent for the subject method is sodium bicarbonate. The filters used in the particulate collection device are either fabric or electrostatic. The produced sodium hydroxide and gypsum are separable in a product separator, such as a hydrocyclone. Optionally, in the production of sodium bicarbonate, the spent sorbent may be reacted with sulfuric acid prior to reaction with lime. According to the subject method, flue gas acid gas includes $SO_2$, $SO_3$, HCl and HF and removal includes desulfurization.

Additional features and advantages of the subject disclosure will be readily apparent from the following detailed description in which preferred embodiments have been set forth in detail in conjunction with accompanying drawings.

BRIEF DESCRIPTION OF THE DRAWINGS

The subject disclosure will now be described in more detail with reference to the appended drawings in which.

DETAILED DESCRIPTION

Figure 1:
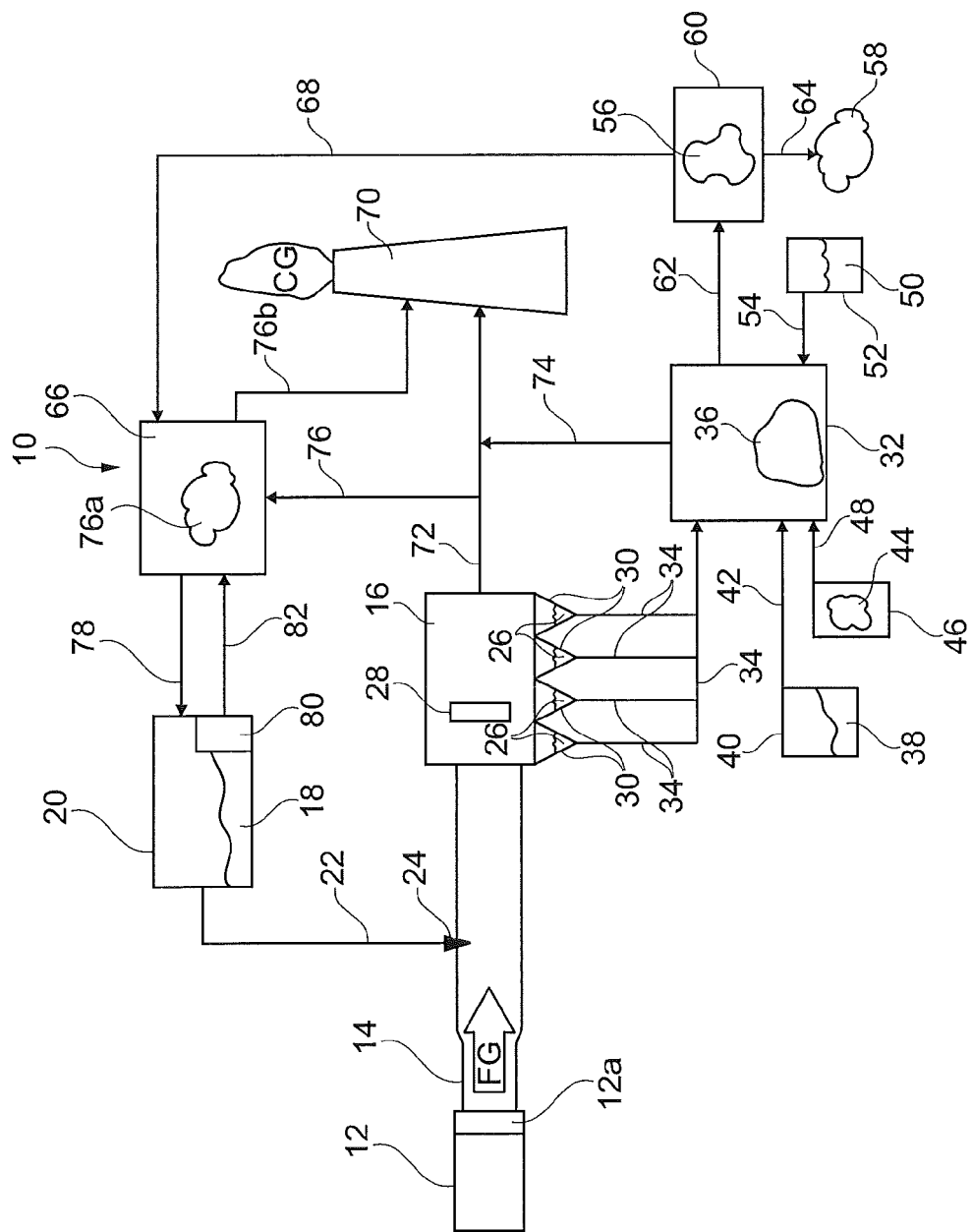
FIG. 1 is a schematic view of a system according to one embodiment of the present invention.

Referring now to the drawings in which like reference numerals indicate like parts, and in particular to FIG. 1, wherein the subject dry flue gas desulfurization system 10 receives a flow of hot flue gas FG from a power or other industrial plant 12 fossil fuel or waste fuel combustion fired furnace or boiler 12*a*. The hot flue gas FG generated by the fossil fuel or waste fuel combustion fired furnace or boiler 12*a* comprises acid gases such as for example $SO_2$, $SO_3$, HCl and HF. The hot flue gas FG enters an injection duct 14 fluidly connected between furnace or boiler 12*a* and a particulate collector 16. Sodium bicarbonate 18 from a sodium bicarbonate source 20 is transported via fluidly connected duct/pipe 22 to an injector 24 for dry or semi-dry sorbent injection (DSI), which injected sorbent can also be in a slurry form, into injection duct 14 and the flue gas FG flowing therethrough. Within injection duct 14, the injected sodium bicarbonate 18 reacts with acid gases such as $SO_2$, $SO_3$, HCl and HF in the flue gas FG to remove the acid gases such as $SO_2$, $SO_3$, HCl and HF from the flue gas FG and produce reaction products 26. For example, sodium bicarbonate reacts with flue gas FG $SO_X$ according to the following reactions provided in equations EQ 1, EQ 2 and EQ 3 below.

$$2NaHCO_3 + \text{Heat (from FG)} \rightarrow Na_2CO_3 + H_2O + CO_2 \quad \text{(EQ 1)}$$

$$Na_2CO_3 + SO_2 \rightarrow Na_2SO_3 + CO_2 \quad \text{(EQ 2)}$$

$$Na_2CO_3 + SO_3 \rightarrow Na_2SO_4 + CO_2 \quad \text{(EQ 3)}$$

Flue gas FG having acid gases such as $SO_2$, $SO_3$, HCl and HF removed therefrom, flows from injection duct 14 into fluidly connected particulate collector 16. Within particulate collector 16 at least a portion of the dry reaction products 26, unreacted sodium bicarbonate and carbonate, and fly ash entrained in the flue gas FG is removed therefrom by filters 28 and collected in bottom hoppers 30. The presence of unreacted sodium bicarbonate and carbonate mixed in with the filtered dry reaction products 26, results in further capture of $SO_2$, $SO_3$, HCl and HF from the flue gas FG flowing through the filters 28 of particulate collector 16. Typically, particulate collector 16 is a fabric filter with a plurality of filters 28. However, as one skilled in the art will appreciate, other types of filtration systems and other types of filters or electrostatic precipitators may be utilized. So, in summary, sodium bicarbonate 18 is a freshly prepared slurry, which is injected into the system upstream of the particulate collector 16. The sodium bicarbonate decomposes in the presence of the flue gas FG heat into sodium carbonate, carbon dioxide and water according to equation EQ 1. The sodium carbonate further reacts with the acidic gases and the reaction products along with the unreacted sodium bicarbonate 18 and sodium carbonate collected in the particulate collector 16.

Dry reaction products 26, such as sodium sulphite and sodium sulphate, with unreacted sodium bicarbonate, sodium carbonate and fly ash mixed therein, are transported from bottom hoppers 30 of particulate collector 16 to an alkali reactor 32 via ductwork/pipe 34 fluidly connected between bottom hoppers 30 and alkali reactor 32. Additionally, lime 38 from a lime source 40 is supplied to alkali reactor 32 via a fluidly connected supply duct 42 therebetween. As an alternative, lime can also be supplied in the form of $Ca(OH)_2$. Air 44 from an air source 46 is supplied to alkali reactor 32 via an air pipe 48 fluidly connected between the air source 46 and alkali reactor 32. Water 50 from a water source 52 is supplied to alkali reactor 32 via a water pipe 54 fluidly connected between the water source 52 and the alkali reactor 32. Within alkali reactor 32, dry reaction products 26, unreacted sodium bicarbonate, sodium carbonate and fly ash, hereinafter referred to in combination as collection mixture 36 is reacted with the lime 38 and water 50 to produce sodium hydroxide 56 and calcium sulfite. Also, air 44 within alkali reactor 32 oxidizes the calcium sulphite to produce gypsum 58, according to the following reactions provided in equations EQ 4 and EQ 5 below.

$$Na_2SO_4 + CaO + H_2O \rightarrow 2NaOH + CaSO_4 \quad (EQ\ 4)$$

$$Na_2SO_3 + CaO + H_2O + Air \rightarrow 2NaOH + CaSO_4 \quad (EQ\ 5)$$

The reaction products, sodium hydroxide 56 and gypsum 58, are transported to a product separator 60, such as a hydrocyclone. From the product separator 60, the separated gypsum 58 is removed via port 64 and discarded or used, such as in the production of construction material. Sodium hydroxide 56 from the product separator 60 is transported to a carbon dioxide reactor 66 via a duct/pipe 68 fluidly connected between the product separator 60 and the carbon dioxide reactor 66.

From particulate collector 16, the cleaned flue gas CG flows to a stack 70 via a duct 72 fluidly connected between particulate collector 16 and stack 70 for release of the cleaned flue gas CG to the atmosphere. Additionally, air 44 from the alkali reactor 32 flows to duct 72 for release through stack 70 via duct 74 fluidly connected between alkali reactor 32 and duct 72. A portion of the cleaned flue gas CG, approximately 15 percent or less, or approximately 10 percent or less, or approximately 5 percent or less, is diverted from duct 72 to the carbon dioxide absorber 66 via duct 76 fluidly connected between duct 72 and carbon dioxide absorber 66. Within carbon dioxide absorber 66, sodium hydroxide 56 from product separator 60 reacts with carbon dioxide present in the diverted cleaned flue gas CG to produce sodium bicarbonate 18. The sodium bicarbonate 18 is produced according to the reaction set forth below in equation EQ 6.

$$2NaOH + 2CO_2 \rightarrow 2NaHCO_3 \quad (EQ\ 6)$$

Sodium bicarbonate 18 produced in carbon dioxide absorber 66 is transported to sodium bicarbonate source 20 for use as needed in the dry flue gas desulfurization system 10 via duct 78 fluidly connected between carbon dioxide absorber 66 and sodium bicarbonate source 20. In the sodium bicarbonate source 20, dewatering equipment such as a hydrocyclone, belt filter, centrifuge, dryer, or the like, can be used to maintain the desired sodium bicarbonate concentration. Diverted cleaned flue gas CG flowing through carbon dioxide absorber 66 is transported to stack 70 via duct 76b fluidly connected between carbon dioxide absorber 66 and stack 70. Sodium bicarbonate source 20 may include a particulate separator 80. Any unreacted sodium hydroxide 56 from particulate separator 80 may be returned to carbon dioxide absorber 66 via duct 82 fluidly connected between particulate separator 80 and carbon dioxide absorber 66.

A method of using the dry flue gas desulfurization system 10 comprises injecting sodium bicarbonate 18 into a flue gas FG stream upstream of a particulate collector 16 to remove acid gases such as $SO_2$, $SO_3$, HCl and HF from the flue gas FG, reacting collection mixture 36 collected in the particulate collector 16 with lime 38, air 44 and water 50 to produce sodium hydroxide 56 and gypsum 58, reacting the produced sodium hydroxide 56 with carbon dioxide from a slip stream of the cleaned flue gas CG downstream of the particulate collector 16 to produce sodium bicarbonate 18 for injection into the system 10.

Figure 2:
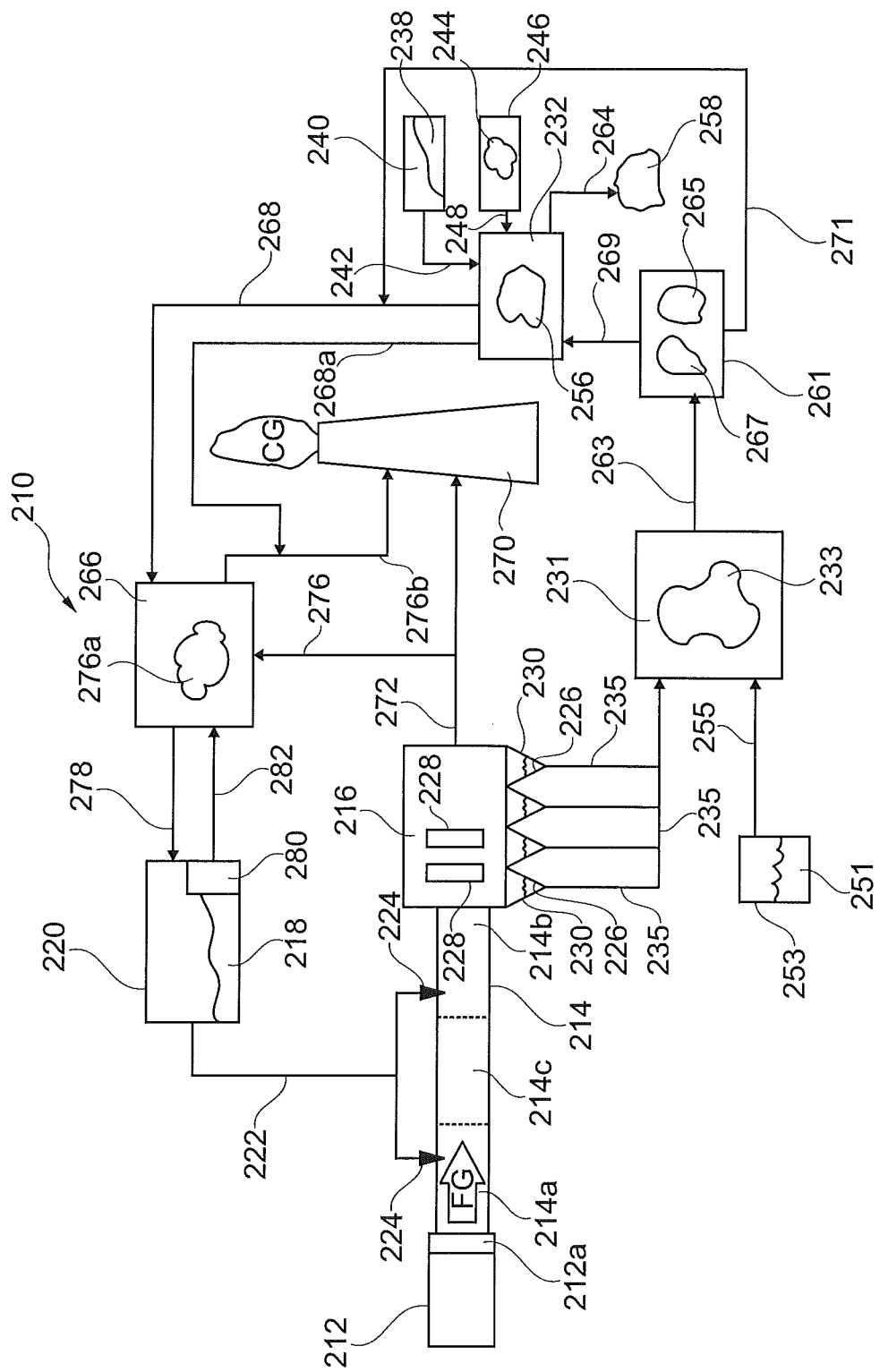
FIG. 2 is a schematic view of a system according to another embodiment of the present invention.

Schematically illustrated in FIG. 2, is another embodiment of the subject dry flue gas desulfurization system and method. The system illustrated in FIG. 2 has features in common with those illustrated in FIG. 1. As such, features illustrated in FIG. 2 common to those of FIG. 1 are signified using the same reference numbers but with the number "2" preceding them.

Now referring to FIG. 2, is another embodiment of the subject dry flue gas desulfurization system 210. The subject dry flue gas desulfurization system 210 receives a flow of hot flue gas FG from a power or other industrial plant 212 fossil fuel or waste fuel combustion fired furnace or boiler 212a. The hot flue gas FG generated by the fossil fuel or waste fuel combustion fired furnace or boiler 212a comprises acid gases such as for example $SO_2$, $SO_3$, HCl and HF. The hot flue gas FG enters an injection duct 214 fluidly connected between furnace or boiler 212a and a particulate collector 216. Sodium bicarbonate 218 from a sodium bicarbonate source 220 is transported via fluidly connected duct 222 to an injector 224 arranged upstream 214a and/or downstream 214b from an optional air preheater 214c arranged within injection duct 214. Sodium bicarbonate 218 is injected according to dry sorbent injection (DSI) by one or more injectors 224 into injection duct 214 and the flue gas FG flowing therethrough. As such, sodium bicarbonate 218 is injected into injection duct 214 in either dry form, semi-dry form or in slurry form. Within injection duct 214, the injected sodium bicarbonate 218 reacts with acid gases such as $SO_2$, $SO_3$, HCl and HF in the flue gas FG to remove the acid gases such as $SO_2$, $SO_3$, HCl and HF from the flue gas FG and produce reaction products 226. For example, sodium bicarbonate reacts with flue gas FG $SO_X$ according to the following reactions provided in equations EQ 7, EQ 8 and EQ 9 below.

$$2NaHCO_3 + Heat\ (from\ FG) \rightarrow Na_2CO_3 + H_2O + CO_2 \quad (EQ\ 7)$$

$$Na_2CO_3 + SO_2 \rightarrow Na_2SO_3 + CO_2 \quad (EQ\ 8)$$

$$Na_2CO_3 + SO_3 \rightarrow Na_2SO_4 + CO_2 \quad (EQ\ 9)$$

Flue gas FG having acid gases such as $SO_2$, $SO_3$, HCl and HF removed therefrom, flows from injection duct 214 into fluidly connected particulate collector 216. Within particulate collector 216 at least a portion of the dry reaction products 226, unreacted sodium bicarbonate 218, sodium carbonate and fly ash entrained in the flue gas FG is removed therefrom by filters 228 and collected in bottom hoppers 230. The presence of unreacted sodium bicarbonate 218 mixed in with the filtered dry reaction products 226, results in further capture of $SO_2$, $SO_3$, HCl and HF from the flue gas FG flowing through the filters 228 of particulate collector 216. Typically, particulate collector 216 is a fabric filter with a plurality of filters 228. However, as one skilled in the art will appreciate, other types of filtration systems and other types of filters or electrostatic precipitators may be utilized.

Dry reaction products 226, such as sodium carbonate, sodium sulphite and sodium sulphate, with unreacted sodium bicarbonate 218, sodium carbonate and fly ash mixed therein, are transported from bottom hoppers 230 of particulate collector 216 to a mixing tank 231 via ductwork 235 fluidly connected between bottom hoppers 230 and mixing tank 231. Water 251 from a water supply 253 is supplied to mixing tank 231 via a water pipe 255 fluidly connected between the water supply 253 and the mixing tank 231. The reaction products 226, unreacted sodium bicarbonate, sodium carbonate and fly ash are mixed with water 251 in the mixing tank 231 to produce a moistened product or slurry 233. The resultant moistened product or slurry 233 is transported to a product separator 261 such as a hydrocyclone via duct 263 fluidly connected between mixing tank 231 and product separator 261. Within product separator 261, the moistened product or slurry 233 is separated into a sodium sulfite and sodium sulfate portion 265 and a sodium carbonate portion 267. The sodium carbonate portion 267 is transported via fluidly connected duct 271 and fluidly connected duct 268 to carbon dioxide absorber 266. The sodium sulfite and sodium sulfate portion 265 is transported to an alkali reactor 232 via ductwork 269 fluidly connected between product separator 261 and alkali reactor 232. Additionally, lime 238 from a lime source 240 is supplied to alkali reactor 232 via a fluidly connected supply duct 242 therebetween. As an option, air 244 from an air source 246 is supplied to alkali reactor 232 via an air pipe 248 fluidly connected between the air source 246 and alkali reactor 232. Within alkali reactor 232, the sodium sulfite and sodium sulfate portion 265 is reacted with the lime 38 and water 50 to produce sodium hydroxide 256. In the reactor 232, sodium sulphate and sodium sulphite is converted to calcium sulphate and calcium sulphite. Also, air 244 within alkali reactor 232 oxidizes some of the calcium sulphite to produce gypsum 258, according to the following reactions provided in equations EQ 10 and EQ 11 below.

$$CaSO_3 + 1/2O_2 \rightarrow CaSO_4 \qquad (EQ10)$$

$$Na_2SO_4 + CaO + H_2O \rightarrow 2NaOH + CaSO_4 \qquad (EQ11)$$

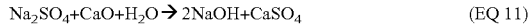

From a port 264, gypsum 258 is removed from the alkali reactor 232 and discarded or used, such as in the production of construction material. Sodium hydroxide 256 from the alkali reactor 232 is transported to a carbon dioxide absorber 266 via a duct 268 fluidly connected between the alkali reactor 232 and the carbon dioxide absorber 266.

From particulate collector 216, the cleaned flue gas CG flows to a stack 270 via a duct 272 fluidly connected between particulate collector 216 and stack 270 for release of the cleaned flue gas CG to the atmosphere. A portion of the cleaned flue gas CG, approximately 15 percent or less, or approximately 10 percent or less, or approximately 5 percent or less, is diverted from duct 272 to the carbon dioxide absorber 266 via duct 276 fluidly connected between duct 272 and carbon dioxide absorber 266. Within carbon dioxide absorber 266, sodium hydroxide 256 from alkali reactor 232 reacts with carbon dioxide 276a present in the diverted cleaned flue gas CG to produce sodium bicarbonate 218. The sodium bicarbonate 218 is produced according to the reaction set forth below in equation EQ 12.

$$2NaOH + 2CO_2 \rightarrow 2NaHCO_3 \qquad (EQ12)$$

Sodium bicarbonate 218 produced in carbon dioxide absorber 266 is transported to sodium bicarbonate source 220 for use as needed in the dry flue gas desulfurization system 210 via duct 278 fluidly connected between carbon dioxide absorber 266 and sodium bicarbonate source 220. Sodium bicarbonate source 220 may include a solid-liquid separator or dryer 280. Any unreacted sodium hydroxide 256 from solid-liquid separator or dryer 280 may be returned to carbon dioxide absorber 266 via duct 282 fluidly connected between particulate separator 280 and carbon dioxide absorber 266. Diverted cleaned flue gas CG flowing through carbon dioxide absorber 266 is transported to stack 270 via duct 276b fluidly connected between carbon dioxide absorber 266 and stack 270. Fluidly connected to duct 276b is duct 268 a. Duct 268a is fluidly connected between duct 276b and alkali reactor 232. Air 244 supplied to alkali reactor 232 flows through duct 268a and into duct 276b. From stack 270, diverted cleaned flue gas CG and air 244 from duct 276b is released to the atmosphere.

A method of using the dry flue gas desulfurization system 210 comprises injecting sodium bicarbonate 218 into a flue gas FG stream upstream 214a or downstream 214b of an optional air preheater 214c upstream of a particulate collector 216 to remove acid gases such as $SO_2$, $SO_3$, HCl and HF from the flue gas FG, mixing reaction products 226, unreacted sodium bicarbonate, sodium carbonate and fly ash with water 251 to produce a moistened product or slurry 233, separating the moistened product or slurry 233 into a sodium sulfite and sodium sulfate portion 265 and a sodium carbonate portion 267, reacting the sodium sulfite and sodium sulfate portion 265 with air 244 and lime 238 to produce sodium hydroxide 256, and reacting the sodium hydroxide 256 with carbon dioxide 276a from diverted cleaned flue gas CG to produce sodium bicarbonate 218 for injection into the system 210.

Figure 3:
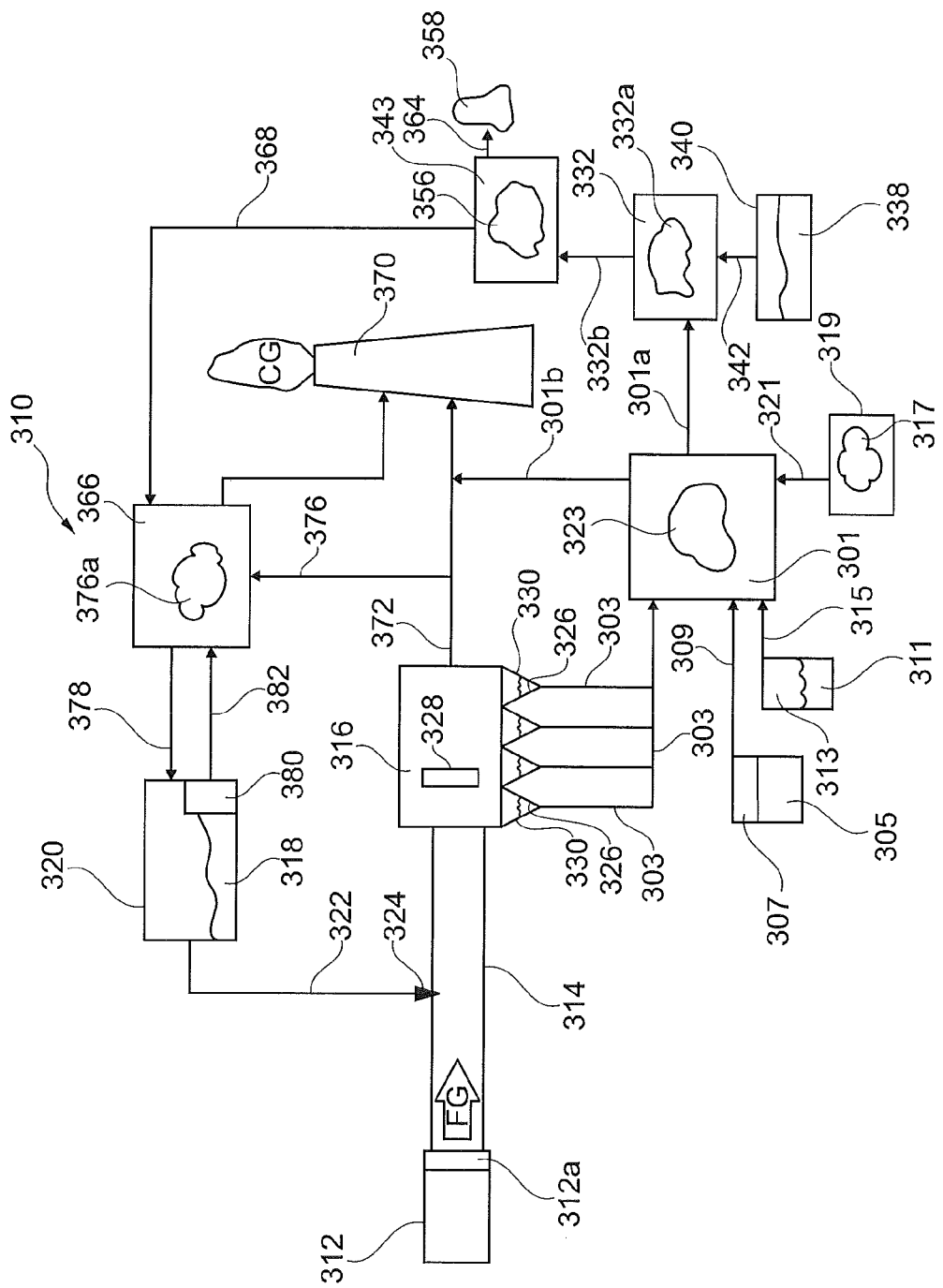
FIG. 3 is a schematic view of a system according to another embodiment of the present invention.

Schematically illustrated in FIG. 3, is another embodiment of the subject dry flue gas desulfurization system and method. The system illustrated in FIG. 3 has features in common with those illustrated in FIG. 1. As such, features illustrated in FIG. 3 common to those of FIG. 1 are signified using the same reference numbers but with the number "3" preceding them.

Now referring to FIG. 3, is another embodiment of the subject dry flue gas desulfurization system 310. The subject dry flue gas desulfurization system 310 receives a flow of hot flue gas FG from a power or other industrial plant 312 fossil fuel or waste fuel combustion fired furnace or boiler 312a. The hot flue gas FG generated by the fossil fuel or waste fuel combustion fired furnace or boiler 312a comprises acid gases such as for example $SO_2$, $SO_3$, HCl and HF. The hot flue gas FG enters an injection duct 314 fluidly connected between furnace or boiler 312a and a particulate collector 316. Sodium bicarbonate 318 from a sodium bicarbonate source 320 is transported via fluidly connected duct 322 to an injector 324 for dry sorbent injection (DSI) into injection duct 314 and the flue gas FG flowing therethrough. As such, sodium bicarbonate 318 is injected into injection duct 314 in either dry form, semi-dry form or in slurry form. Within injection duct 314, the injected sodium bicarbonate 318 reacts with acid gases such as $SO_2$, $SO_3$, HCl and HF in the flue gas FG to remove the acid gases such as $SO_2$, $SO_3$, HCl and HF from the flue gas FG and produce reaction products 326. For example, sodium bicarbonate reacts with flue gas FG $SO_X$ according to the following reactions provided in equations EQ 13, EQ 14 and EQ 15 below.

$$2NaHCO_3 + \text{Heat (from FG)} \rightarrow Na_2CO_3 + H_2O + CO_2 \qquad (EQ13)$$

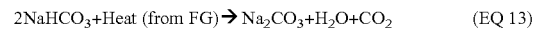

$$Na_2CO_3 + SO_2 \rightarrow Na_2SO_3 + CO_2 \qquad (EQ14)$$

$$Na_2CO_3 + SO_3 \rightarrow Na_2SO_4 + CO_2 \qquad (EQ15)$$

Flue gas FG having acid gases such as $SO_2$, $SO_3$, HCl and HF removed therefrom, flows from injection duct 314 into fluidly connected particulate collector 316. Within particulate collector 316 at least a portion of the dry reaction products 326, unreacted sodium bicarbonate 318, sodium carbonate and fly ash entrained in the flue gas FG is removed therefrom by filters 328 and collected in bottom hoppers 330. The presence of unreacted sodium bicarbonate 318 mixed in with the filtered dry reaction products 326, results in further capture of $SO_2$, $SO_3$, HCl and HF from the flue gas FG flowing through the filters 328 of particulate collector 316. Typically, particulate collector 316 is a fabric filter with a plurality of filters 328. However, as one skilled in the art will appreciate, other types of filtration systems and other types of filters or electrostatic precipitators may be utilized.

Dry reaction products 326, such as sodium carbonate, sodium sulphite and sodium sulphate, with unreacted sodium bicarbonate 318, sodium carbonate and fly ash mixed therein, are transported from bottom hoppers 330 of particulate collector 316 to a reaction tank 301 via ductwork 303 fluidly connected between bottom hoppers 330 and reaction tank 301. Supplied to reaction tank 301 is sulfuric acid 305 from a sulfuric acid source 307 via duct 309 fluidly connected between sulfuric acid source 307 and reaction tank 301. Water 311 from a water source 313 is supplied to reaction tank 301 via duct 315 fluidly connected between water source 313 and reaction tank 301. Air 317 from an air source 319 is supplied to reaction tank 301 via duct 321 fluidly connected between air source 319 and reaction tank 301. Dry reaction products 326, such as sodium carbonate, sodium sulphite and sodium sulphate, with unreacted sodium bicarbonate 318, sodium carbonate and fly ash mixed therein, react with the sulfuric acid 305, water 311 and air 317 supplied to the reaction tank 301 to produce a moistened or a slurry of sodium sulfate 323. The resultant moistened or slurry of sodium sulfate 323 is transported to an alkali reactor 332 via duct 301a fluidly connected between reaction tank 301 and alkali reactor 332. Lime 338 from a lime source 340 is supplied to alkali reactor 332 via a fluidly connected supply duct 342 therebetween. Within alkali reactor 332, sodium sulfate 323 reacts with the lime 338 to produce a product 332a. Product 332a is transported from alkali reactor 332 to a product separator 343 via duct 332b fluidly connected between the alkali reactor 332 and the product separator 343. The product separator 343, such as a hydrocyclone separates product 332a into sodium hydroxide 356 and gypsum 358. Gypsum 358 is produced according to the following reaction provided in equation EQ 16 below.

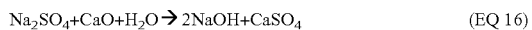

$$Na_2SO_4 + CaO + H_2O \rightarrow 2NaOH + CaSO_4 \quad (EQ\ 16)$$

From the product separator 343, the separated gypsum 358 is removed via port 364 and discarded or used, such as in the production of construction material. Sodium hydroxide 356 from the product separator 343 is transported to a carbon dioxide absorber 366 via a duct 368 fluidly connected between the product separator 343 and the carbon dioxide absorber 366.

From particulate collector 316, the cleaned flue gas CG flows to a stack 370 via a duct 372 fluidly connected between particulate collector 316 and stack 370 for release of the cleaned flue gas CG to the atmosphere. Additionally, air 317 and produced carbon dioxide from reaction tank 301 flow into duct 372 via duct 301b fluidly connected between reaction tank 301 and duct 372. Via duct 372, air 317 and produced carbon dioxide from reaction tank 301 are likewise released to the atmosphere via stack 370. A portion of the cleaned flue gas CG, approximately 15 percent or less, or approximately 10 percent or less, or approximately 5 percent or less, is diverted from duct 372 to the carbon dioxide absorber 366 via duct 376 fluidly connected between duct 372 and carbon dioxide absorber 366. Within carbon dioxide absorber 366, sodium hydroxide 356 from product separator 343 reacts with carbon dioxide 376a present in the diverted cleaned flue gas CG to produce sodium bicarbonate 318. The sodium bicarbonate 318 is produced according to the reaction set forth below in equation EQ 17.

$$2NaOH + 2CO_2 \rightarrow 2NaHCO_3 \quad (EQ\ 17)$$

Sodium bicarbonate 318 produced in carbon dioxide absorber 366 is transported to sodium bicarbonate source 320 for use as needed in the dry flue gas desulfurization system 310 via duct 378 fluidly connected between carbon dioxide absorber 366 and sodium bicarbonate source 320. Sodium bicarbonate source 320 may include a particulate separator 380. Any unreacted sodium hydroxide 356 from particulate separator 380 may be returned to carbon dioxide absorber 366 via duct 382 fluidly connected between particulate separator 380 and carbon dioxide absorber 366.

A method of using the dry flue gas desulfurization system 310 comprises injecting sodium bicarbonate 318 into a flue gas FG stream upstream of a particulate collector 316 to remove acid gases from the flue gas FG, reacting dry reaction products 326 with unreacted sodium bicarbonate 318 and fly ash collected in the particulate collector 316 with sulfuric acid 305, water 311 and air 317 to produce a moistened or a slurry of sodium sulfate 323, reacting the moistened or slurry of sodium sulfate 323 with lime 338 to produce sodium hydroxide 356 and gypsum 358 separated in a product separator 343 such as a hydrocyclone, reacting the sodium hydroxide 356 with carbon dioxide 376a from the cleaned flue gas CG downstream of the particulate collector 316 to produce sodium bicarbonate 318 for injection into the system 310.

The above described embodiments for a dry flue gas desulfurization system 10, 210, 310 and the methods of using the same, provide many advantages in the reduction of harmful acid gas emissions. The dry sorbent injection (DSI) of sodium bicarbonate 18, 218, 318 directly into a duct 14, 214, 314 is relatively simple in comparison to alternative emissions control technologies. In particular, DSI is comparatively less capital cost intensive and at least equally if not more efficient in meeting emissions standards. Additionally, by reproducing the spent sodium bicarbonate 18, 218, 318 the system 10, 210, 310 is also comparatively more economical based on its relatively low operating and maintenance costs. As such, the subject dry flue gas desulfurization system 10, 210, 310 and method of using the same is a relatively low cost and relatively easy-to-use technology for utility plant, waste-to-energy plant and other industrial plant emissions control.

The invention claimed is:

1. A dry flue gas desulfurization system comprising:
   an injector operable to inject a sorbent into a duct through which plant flue gas flows to a particulate collection device for flue gas acid gas removal by the sorbent;
   filters within the particulate collection device operable to collect spent sorbent from flue gas flowing therethrough;
   an alkali reactor operable for reaction of spent sorbent, lime, water and air to produce sodium hydroxide and gypsum; and
   a carbon dioxide absorber operable for reaction of sodium hydroxide with flue gas carbon dioxide to produce sorbent for injection.

2. The system of claim 1, wherein the sorbent is sodium bicarbonate.

3. The system of claim 1, wherein the filters are fabric or electrostatic.

4. The system of claim 1, wherein the produced sodium hydroxide and gypsum are separated in a product separator.

5. The system of claim 1, wherein the produced sodium hydroxide and gypsum are separated in a hydrocyclone.

6. The system of claim 1, wherein the spent sorbent is reacted with sulfuric acid prior to reaction with lime.

7. The system of claim 1, wherein flue gas acid gas removal includes desulfurization.

8. The system of claim 1, wherein flue gas acid gas removal includes $SO_2$, $SO_3$, HCl and HF.

9. A method of dry flue gas desulfurization comprising:
injecting a sorbent into a duct through which plant flue gas flows to a particulate collection device for flue gas acid gas removal by the sorbent;
collecting with filters within the particulate collection device spent sorbent from flue gas flowing therethrough;
reacting spent sorbent, lime, water and air to produce sodium hydroxide and gypsum; and
reacting sodium hydroxide with flue gas carbon dioxide to produce sorbent for injection.

10. The method of claim 9, wherein the sorbent is sodium bicarbonate.

11. The method of claim 9, wherein the filters are fabric or electrostatic.

12. The method of claim 9, wherein the produced sodium hydroxide and gypsum are separated in a product separator.

13. The method of claim 9, wherein the produced sodium hydroxide and gypsum are separated in a hydrocyclone.

14. The method of claim 9, wherein the spent sorbent is reacted with sulfuric acid prior to reaction with lime.

15. The method of claim 9, wherein flue gas acid gas includes $SO_2$, $SO_3$, HCl and HF and removal includes desulfurization.

* * * * *